Figure 1:
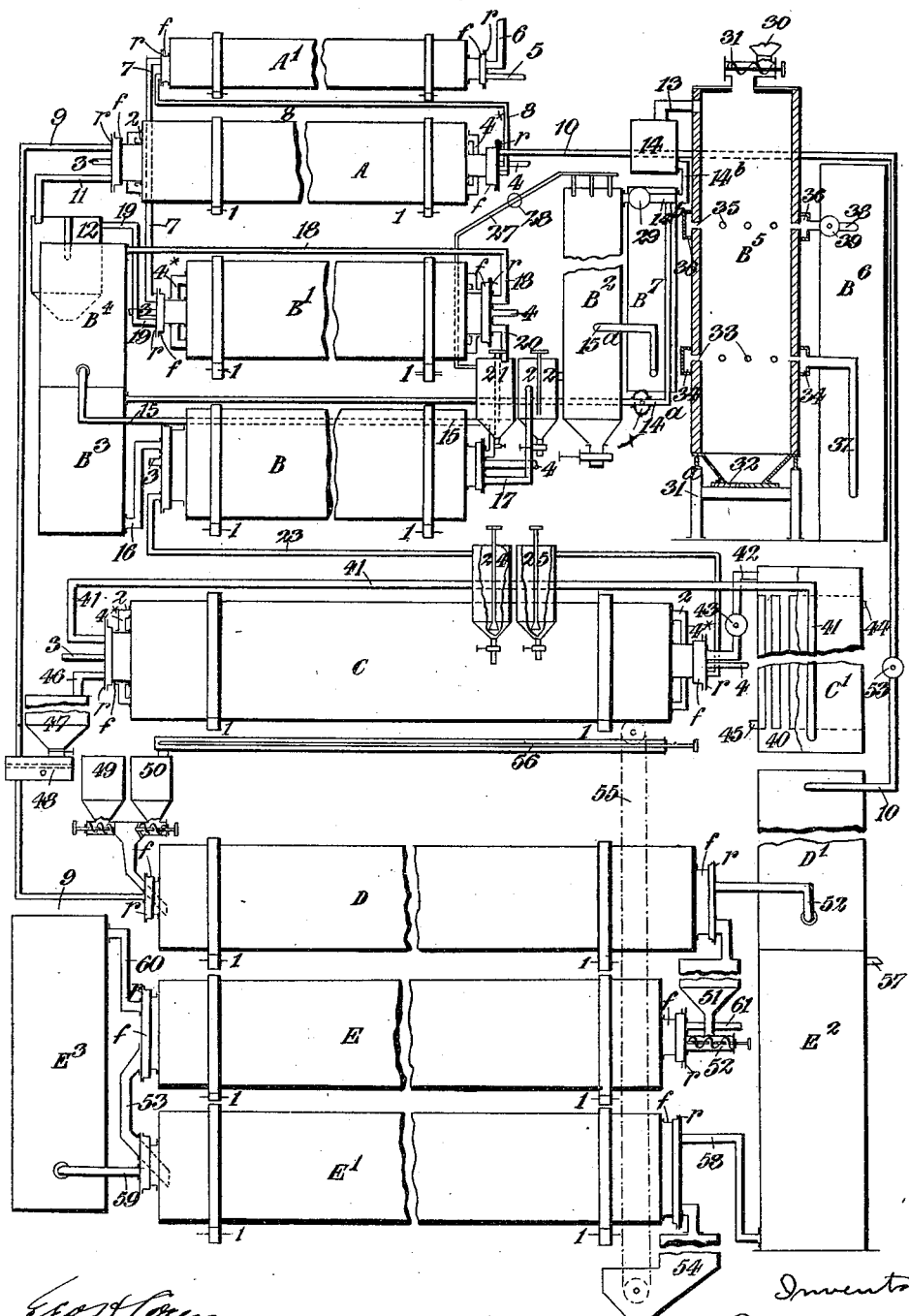

No. 658,723. Patented Sept. 25, 1900.
P. NAEF.
APPARATUS FOR MAKING ALKALIES.
(Application filed Feb. 5, 1900.)
(No Model.) 2 Sheets—Sheet 1.

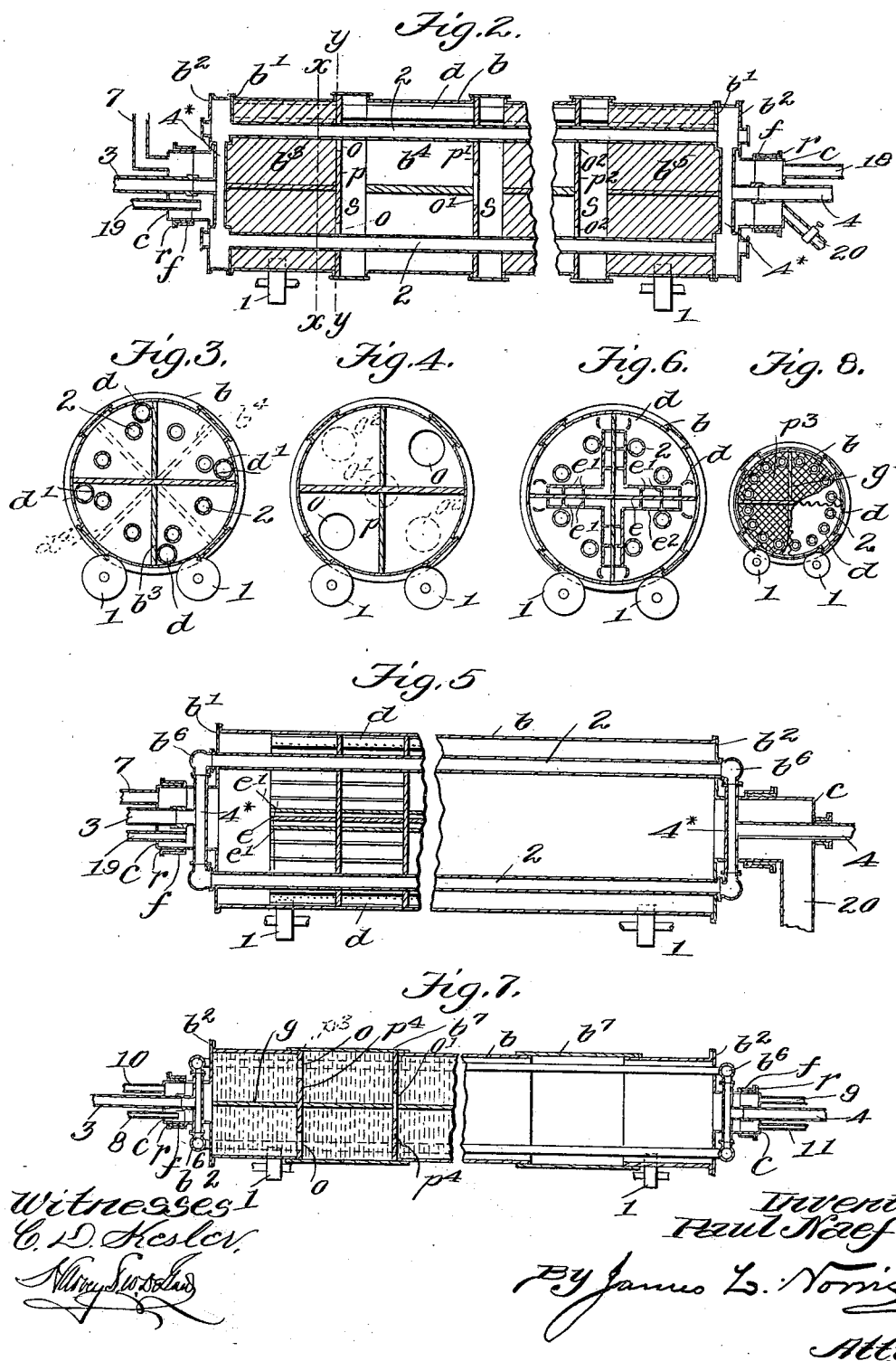

UNITED STATES PATENT OFFICE.

PAUL NAEF, OF NEW YORK, N. Y.

APPARATUS FOR MAKING ALKALIES.

SPECIFICATION forming part of Letters Patent No. 658,723, dated September 25, 1900.

Application filed February 5, 1900. Serial No. 3,998. (No specimens.)

*To all whom it may concern:*

Be it known that I, PAUL NAEF, Ph. D., a citizen of Switzerland, and a resident of No. 132 Woody Crest avenue, near One Hundred and Sixty-fifth street, New York, in the county of New York and State of New York, have invented a certain new and useful Method of Obtaining Alkali Products and Chlorine and in parts Applicable to other Purposes, of which the following is a specification.

This invention refers to the manufacture of alkali products and chlorine from chloride of sodium and is in part applicable also for other purposes which require the treatment of various materials with gases.

The improvements are in connection with the so-called "ammonia-soda" process.

The invention has for its object to recover the chlorine which is at present usually lost in ammonia-soda works, to reduce the large loss of salt which takes place in the ammonia-soda process as carried out at present, to avoid the enormous amount of waste liquor produced at present, to reduce the amount of steam used and the power required for carrying out the present ammonia-soda process, to reduce the loss of ammonia and the volume of waste gases, to reduce the loss of lime in the process and produce cement instead, and to avoid pumping of gas under high pressure.

The herein-described method furnishes a continuous production of bicarbonate of soda and chlorine gas and consists of the following steps:

1. Saturating brine with ammonia-gas obtained in a later step of the process.
2. Treating this saturated liquor with cooled carbonic-acid gas for the production of bicarbonate of soda, a solution of chloride of ammonium being simultaneously produced.
3. Cooling the ammonium-chloride solution for the separation of solid ammonium chloride and returning the remaining solution to step 1 after saturating the same with solid sodium chloride.
4. Separating ammonia from the solid ammonium chloride by heating the latter with an oxide (preferably magnesium oxide) and returning the ammonia gas to step 1.
5. Decomposing the mixture of magnesium oxide and chloride obtained by step 4 by means of heated air, returning the oxide to step 4 and utilizing the chlorine gas obtained by the decomposition for the manufacture of bleaching-powder.

Referring to the drawings, Figure 1 shows the general arrangement of the apparatus. Fig. 2 is a longitudinal section of a suitable form of revolving cylinder for treating the liquor with gas. Figs. 3 and 4 are respectively sections on lines $x$ $x$ and $y$ $y$ of Fig. 2. Fig. 5 is a longitudinal section of a modified form of cylinder for treating the liquor with gases. Fig. 6 is a cross-section of the cylinder shown in Fig. 5. Fig. 7 is a longitudinal section of a suitable form of cylinder for the absorption of gas without the formation of precipitate. Fig. 8 is a cross-section of the cylinder shown in Fig. 7.

Referring to Fig. 1, the process is carried out in revolving cylinders A', A, B', B, C, D, E, and E', mounted on suitable rollers 1 1 and rotated in any suitable manner. In the interior of the cylinders A', A, B', B, and C for treating the liquor there are cooling-pipes 2, which run through the cylinders and are connected at one end to a pipe 3 for supplying a suitable cooling fluid and at the other end with an exit-pipe 4 for said fluid. The interior arrangement of the cylinders may be varied according to the use and according to the quantity of precipitate formed in the apparatus; but said internal arrangement is such that the liquor and gas passing through the cylinders shall come into intimate contact. At each end these cylinders are closed by a stationary end plate or cover $c$, which has a flange fitting loosely into the flange on the end of the cylinder. A suitable packing is placed in the space between the two flanges and is tightened by a loose ring $r$. The stationary end plate carries suitable gas and liquor pipes. Through the center of this end plate passes the pipe 3, which is connected to the cooling-pipes 2 by a connecting-pipe 4, Figs. 1 and 2, and which is to be joined to a stationary supply-pipe by a suitable stuffing-box.

The brine used in the process is saturated with ammonia by passing it first through a washer A' and afterward through a saturator A. The washer A' is used for washing the waste gases resulting after the treatment of the brine with carbonic-acid gas and is constructed so that the said gases pass through it in a zigzag path. The fresh brine runs continually into the washer A' through pipe 5, and the waste gas leaves practically free from ammonia through a pipe 6. The waste gas from cylinder B' enters the washer A' through pipe 7, and the brine leaves the same apparatus through a pipe 8, which delivers the said brine to the saturator A. Ammonia gas from the fourth step of the process, which is carried out in cylinder D, enters this saturator A continuously through a pipe 9. The gas which leaves the saturator A through pipe 10 is returned to D, as later on described. The brine saturated with ammonia leaves the saturator A through a pipe 11 and passes through settling-tank 12 for removal of any lime or other impurity precipitated from the brine. The saturated brine is treated with cooled carbonic-acid gas in the cylinders B and B' for the precipitation of bicarbonate of soda. This operation is carried out with as efficient cooling as possible. This cooling is partly effected by circulating water or other cooling fluid through the pipe system in the cylinders B' and B. As the cooling-pipes get gradually covered with scale, which reduces their efficiency, more thorough cooling is effected by previously cooling the carbonic-acid gas used in the process. This carbonic-acid gas comes from a suitable kiln $B^5$ (to be later on described) through pipe 13 and passes through a suitable washer 14 to remove dust and other impurities. It enters, through a pipe $14^a$, a suitable gas-cooler $B^3$, in which it is cooled to low temperature. The cold gas leaves the cooler through pipe 16 and enters cylinder B, where the said gas is brought into intimate contact with liquor flowing into said cylinder B from pipe 17. The unabsorbed gas leaves the cylinder B through pipe 15 and enters cooler $B^4$. Here the said gas is again cooled and then leaves through pipe 18, through which it enters cylinder B', leaving the latter (practically free of carbonic acid) through pipe 7, by which it is conducted to washer A', as above described. The brine saturated with ammonia enters cylinder B' through pipe 19 from settling-tank 12 and leaves B' by pipe 20. The said brine then flows through settling-tanks 21 and 22 to settle bicarbonate of soda. It then enters cylinder B through pipe 17. From the cylinder B a pipe 23 conducts the said brine through the settling-tanks 24 and 25, in which most of the bicarbonate settled is withdrawn from the conical bottoms.

The system for treating the liquors with carbonic-acid gas above described gives a most intimate contact of gas and liquor and very efficient cooling and can be used for very dilute gases. The said system requires very little gas-pressure, which may be supplied by a suitable fan.

The coolers $B^4$ and $B^3$ may be of any suitable construction. They can be constructed on the principle of the locomotive-boiler, and any suitable fluid can be used for cooling. As no liquor passes through these gas-coolers, they need no cleaning and their efficiency does not become less as the process proceeds.

If ammoniated brine is treated in the way described, it is noticed that but little bicarbonate of soda is formed in the beginning and also toward the end of the treatment. Most of the precipitation takes place during a middle period. It is therefore of advantage to treat the liquor during this middle period in an apparatus which allows an easy removal of the bicarbonate of soda and that can easily be cleaned without interfering with the general run of the process. Apparatus $B^2$ consists of a vertical cylinder having a suitable filling or checker-work, which gives no resistance and can be quickly removed or cleaned by steaming. A continuous flow of liquor is sent into the top of the apparatus $B^2$ through pipe 27, leading from settling-tank 21 and aided by a pump 28, connected with said pipe. During its passage through $B^2$ this liquor meets a current of cold strong carbonic-acid gas. Much of the bicarbonate of soda is thereby caused to settle in the conical bottom of $B^2$, from which it is withdrawn. The liquor flows from $B^2$ into settling-tank 22 and afterward into cylinder B, in which the last traces of bicarbonate of soda are precipitated. It will be noticed that no attempt is made to get a complete absorption of the carbonic acid in $B^2$. The object is to throw down as much bicarbonate of soda as possible with an excess of carbonic-acid gas and to leave the complete absorption of the gas to an apparatus more suitable for that purpose. The gas is circulated through $B^2$ by means of a suitable fan 29, which draws carbonic acid from pipe $14^b$, forces it through cooler $B^7$, and delivers it into $B^2$ through pipe $15^a$ and returns it to pipe $14^a$, which conducts it to gas-cooler $B^3$, and thence through pipe 16 to carbonater B.

The arrangement chosen for treating the brine with carbonic-acid gas will depend greatly on the percentage of carbonic acid in the gas. In some cases it may be sufficient to pass the ammoniated brine through B' and $B^2$. For the purpose of further facilitating the treatment with carbonic acid and to enable a larger production in very small apparatus I produce a carbonic-acid gas containing very little nitrogen. For this purpose I calcine limestone or other material by means of heated carbonic-acid gas. After the carbonic acid has passed through the limestone it is reheated and passed through the limestone again as often as required.

The limestone-kiln $B^5$ consists of a shaft with suitable arrangements for continuously charging limestone on top, consisting of a hopper 30 and a conveyer 31. The kiln is supported on columns $31^a$ and has a conical bottom with doors 32. Some distance from the latter are gas-ducts 33 and an annular channel 34, and at a higher level, but a considerable distance from the top, are gas-offtakes 35 and an annular channel 36. The annular channel 34 is connected with the bottom of a gas-heater $B^6$ by means of a pipe 37. The annular channel 36 is connected to the heater $B^6$ by means of a pipe 38. By means of a fan 39 a continuous circulation of hot gas is kept up between the heater $B^6$ and the kiln $B^5$ in such a manner that highly-heated carbonic acid enters the kiln $B^5$ through the ducts 33, acts on the limestone in $B^5$ until the temperature of said gas is reduced, (below the temperature of reaction,) leaves through the offtakes 35, and again enters the heater through the pipe 38. The carbonic acid produced by the action of the hot gas upon the limestone passes through the fresh limestone in the upper part of the kiln $B^5$ and leaves in cool condition through pipe 13. As the gas thus obtained contains practically no nitrogen, (instead of from sixty to ninety per cent., as is usual in limekiln-gas,) the absorption apparatus can be of small size, the chief point being to cool the carbonic-acid gas sufficiently to get a complete precipitation of the bicarbonate of soda.

The settling-tanks 21, 22, 24, and 25 may with advantage be fitted with agitators in their conical bottoms. The bicarbonate of soda is withdrawn from these vessels in form of a thick sludge and is subsequently washed in a filter or in a centrifugal apparatus. The liquor which leaves the settling-tank 25 consists of a solution of chloride of ammonium holding some chloride of sodium. This liquor is subjected to a low temperature in cylinder C for the separation of solid chloride of ammonium. The vessel C is constructed in a similar manner to cylinders B and B', having a system of cooling-pipes in the interior, through which a cooling fluid circulates. The cylinder C is further connected with a gas-cooler C', which latter consists of a cylinder containing a system of pipes 40. The space below pipes 40 is connected with one end of the cylinder C by a pipe 41 and the space above the pipes 40 communicates with the other end of C by a pipe 42. Fan 43 causes a continuous circulation of gas through C and C' in such a manner that gas cooled to very low temperature enters C through pipe 41, cools the liquor, and thus precipitates ammonium chloride during its passage through the cylinder C, and afterward reënters the cooler C' through pipe 42. The gas is cooled in the cooler C' by circulating a cooling fluid through the space surrounding pipes 40, which cooling fluid enters the cooler C' at 44 and leaves the said cooler at 45. As the liquor is brought into intimate contact with the cold gas in cylinder C the precipitation of ammonium chloride is rapid and the apparatus has a large capacity. The liquor holding chloride in suspension leaves the cylinder C through pipe 46 and runs through settling-tank 47, which may be fitted with an agitator. The ammonium chloride is drawn into a suitable filter 48, where it is washed. The liquor flowing from settling-tank 47 consists mostly of a solution of sodium chloride and is returned to the process through the pipe 5 to washer A' after being saturated with solid sodium chloride. All the sodium chloride is thus utilized in the process. The solid ammonium chloride from filter 48 may be treated with magnesium oxide or other suitable oxide for the evolution of ammonia according to the following reaction:

$$2NH_4Cl + MgO = MgCl_2 + H_2O + 2NH_3.$$

This reaction takes place in cylinder D, which is constructed of cast-iron in a similar manner to cylinder B. If a pipe system is used in the interior of D, it is used for heating instead of cooling. The use of such heating-pipes is not absolutely necessary with my system, and I prefer to supply all the heat for the reaction by means of a heated inert gas. The mixture of oxide of magnesium and chloride of ammonium is simultaneously heated and agitated, a rapid and complete elimination of ammonia being thereby effected. This mixture of chloride of ammonium and oxide of magnesium is produced by discharging the former continuously from hopper 49 and the latter from hopper 50. The mixture passes through the cylinder D, and a mixture of chloride and oxide of magnesium free from ammonia is discharged into hopper 51. A hot inert gas enters the cylinder D from a heater D' through a pipe 52 and leaves the said cylinder containing much ammonia-gas through pipe 9, which leads to the absorber A. After the removal of its ammonia in the cylinder A the gas is conducted back to the heater D' by means of the pipe 10. The fan 53 effects a continuous circulation through heater D', cylinder D, and absorber A, as described. The mixture of chloride and oxide of magnesium is next heated for the production of chlorine in furnaces E and E'. These furnaces consist of iron cylinders supported and rotated in any convenient way. At each end they have stationary plates connected to the furnace by means of a stuffing-box similar to the one used on the other cylinders B, &c. The solid material enters the furnace E continuously through a conveyer $52^a$, descends from the furnace E to the furnace E' through a pipe 53, and is discharged from the furnace E' into a hopper 54. The material discharged from the hopper 54 consists of practically-pure magnesium oxide, which is raised to the hopper 50 by means of an elevator 55 and a conveyer 56, and is used over again in the process. The air, which effects the decomposition of the magnesium chloride into chlorine and magnesium oxide, enters the heater $E^2$ through pipe 57, and in passing through the said heater is brought to high temperature. The said heated air then enters the furnace E' through a pipe 58. Dilute chlorine gas leaves the furnace E' through a pipe 59, and after being reheated by passing through a heater $E^3$ enters the furnace E by means of pipe 60. From cylinder E concentrated chlorine gas is conducted through a pipe 61 to suitable absorbers (not shown) for the production of bleaching-powder. Suitable fans (not shown) can be used for the purpose of assisting the passage of the gas through the heaters $E^2$ and $E^3$ and the furnaces E and $E'$.

The method described is continuous and the apparatus is of large capacity. It gives no waste liquor or other waste material. Practically all the chlorine and alkali are recovered from the salt. No pressure-pumps are required for pumping carbonic acid. As no lime is required in the process, cement or hydrate of lime can with advantage be produced as a by-product. As no pumping of the carbonic-acid gas is required, ordinary furnace-gases can with advantage be used as a source of carbonic acid, in which case the absorption plant is made of larger size. In their passage through the rotary cylinders of the apparatus the liquor and gas are brought into thorough and intimate contact with each other by means hereinafter described, comprising devices for lifting the liquor and showering it through the gas and onto perforated or wire-gauze partitions, whereby the liquor and cold gas are distributed and thoroughly mingled in a state of fine subdivision, which insures the most intimate contact of the gas and liquor, thereby effecting a rapid, complete, and economical precipitation of soda bicarbonate and other alkali products.

The methods and apparatus described are in part applicable for similar purposes requiring the treatment of various materials with gases.

Referring to Figs. 2, 3, and 4, $b$ is the shell or outer casing of the cylinder. 2 2 are the cooling-pipes, which terminate at each end of the cylinder in plates $b'$ $b'$. The pipes 2 may be secured to the plates $b'$ $b'$ by means of flanges or by the method usually employed in locomotive-boilers. There is an annular space between each of the plates $b'$ $b'$ and the end plates $b^2$ $b^2$ of the cylinder, with which spaces the pipes 2 communicate. 3 is the cooling-fluid-inlet pipe. 4 is the cooling-fluid-outlet pipe, and 4* 4* are pipes, respectively connecting the pipes 3 and 4 with the annular spaces between the plates $b'$ $b'$ and $b^2$ $b^2$. The cooling fluid enters by the pipe 3, passes through the pipes 2 2, and leaves by the pipe 4, as indicated by the arrows. Each of the end plates $b^2$ is provided with a flange $f$, into which fits a stationary cover $c$, provided with a rim. A suitable packing is placed between the flange $f$ and the cover $c$, which packing is held in position by an adjustable ring $r$. The liquor enters the cylinder through the pipe 19, and the liquor containing the precipitate leaves the opposite end of the cylinder by the pipe 20. The gas enters the cylinder through the pipe 18 and leaves through the pipe 7. The cover $c$ is preferably made larger at that end of the cylinder at which the outlet 20 is situated. The cylinder is rotated in any suitable manner and is supported by suitable rollers 1 1, which run on hoops or bands attached to the cylinder. The interior of the cylinder is divided into sections $b^3$ $b^4$ $b^5$, provided with perforated longitudinal partitions, which may advantageously consist of wire-gauze. Between these sections are open spaces $s$, which are accessible for cleaning purposes through suitable manholes. The said longitudinal partitions of each section are preferably arranged in radially-offset positions or at an angle to the longitudinal partitions of the adjacent section or sections in such manner that the longitudinal partitions of section $b^3$ have the position shown in full line in Fig. 3, while the longitudinal partitions of the adjacent section $b^4$ have the position shown in dotted lines in Fig. 3. The longitudinal partitions of section $b^5$ can again have the position of those of the section $b^3$. This arrangement insures a very intimate contact of the liquor and gas in their passage through the cylinder. Vertical cross-partitions $p$ $p'$ $p^2$, respectively provided with openings $o$ $o'$ $o^2$, are arranged in such manner as to cause the gas to pass through the cylinder in a zigzag path. For the purpose of raising the liquor and showering it on the perforated longitudinal partitions as the cylinder revolves pipes $d$ $d$, provided with openings $d'$ $d'$, are arranged. The pipes $d$ $d$ may be formed on or fastened to the longitudinal partitions or they may be fastened to the cylinder. The said pipes may extend through the cylinder or, if the cylinder is arranged in sections, the pipes may also be formed in sections. The pipes $d$ are so arranged that liquor is discharged through them onto the perforated longitudinal partitions during the revolution of the cylinder.

Referring to Figs. 5 and 6, $b$ is the shell or casing of the cylinder. 2 represents the cooling-pipes. $b^2$ $b^2$ are the end plates of the cylinder. The pipes 2 2 pass through the end plates $b^2$ $b^2$, and the ends of said pipes communicate, respectively, with annular pipes $b^6$ $b^6$. 3 is the cooling-fluid inlet, and 4 is the cooling-fluid outlet. 4* 4* are pipes respectively connecting the pipes 3 and 4 with the annular pipes $b^6$ $b^6$. The flanges $f$, rings $r$, and covers $c$ are arranged as described with reference to the preceding figures. The liquor enters the cylinder through the pipe 19 and leaves through the pipe 20. The gas enters the cylinder through the pipe 20 and leaves through the pipe 7. This arrangement is of special advantage if the liquor passes through several cylinders successively, as the pipe 20 serves both for conveying the liquor from the upper to the lower cylinder and for conveying gas from the lower to the upper cylinder. In the interior of the cylinder there is a space at the charging end and radial partitions $e$ $e$, running through the rest of the cylinder. These radial partitions *e e* meet on the axis of the cylinder and are provided with longitudinal ribs *e' e'*. The partitions *e* and ribs *e'* may be cast together and are both perforated. They may with advantage be made of wire-gauze or of wood. The ribs *e'* act as distributers of the liquor and prevent the liquor from running off the partitions *e* too quickly. It is often of advantage to use corrugated wire-gauze for the ribs *e'*, the corrugations being so formed as to effect a result similar to that effected by the ribs *e'*. The pipes *d d* for showering the liquor are shown as forming part of the partitions *e*. For the purpose of preventing the liquor from running through the partitions too quickly there are further arranged cross-ribs $e^2$ on the partitions *e*. Usually, also, perforated cross-partitions, such as described with reference to Figs. 2, 3, and 4, are employed. The ribs *e'* and $e^2$ are only shown in part of the cylinder. They may be omitted near the discharge end. It is usually of advantage to run the radial partitions *e* up to the discharge end of the cylinder, as they assist in discharging the solid material.

Referring to Figs. 7 and 8, *b* is the cylinder shell or casing. 2 2 are the cooling-pipes. $b^6 b^6$ are the annular pipes connecting the ends of the cooling-pipes. $b^2 b^2$ are the cylinder ends. *f f* are the flanges. *r r* are the rings, and *c c* are the fixed covers. 3 is the cooling-fluid inlet. 4 is the cooling-fluid outlet. $4^* 4^*$ are the pipes respectively conecting the cooling-fluid inlet and outlet with the annular pipes $b^6$, as previously described. 8 is the liquor-inlet. 11 is the liquor-outlet. 9 is the gas-inlet, and 10 is the gas-outlet. In the interior of the cylinder are arranged a number of perforated vertical cross-partitions $p^3 p^3$, which usually consist of wire-gauze. At suitable intervals there are also arranged vertical cross-partitions $p^4$, which are not perforated, but are provided with openings *o o'*, which serve to cause the gas to travel in a zigzag path in a similar manner to that described in Figs. 2, 3, and 4. For the purpose of cleaning the partitions $p^3$ and also the spaces between these partitions doors $b^7$ are provided. These doors $b^7$ permit a thorough cleaning of the partitions without removing the latter. *d d* are a number of perforated pipes at the periphery of the cylinder for showering the liquor onto the partitions $p^3$. As the pipes *d d* reach their lowest position they fill with liquor, which they empty onto the partitions $p^3$ as the cylinder revolves. The cooling-pipes 2 2 can be arranged alternately with the lifting-pipes *d d*. It is often of advantage to use radial longitudinal partitions *g*, which assist in raising the liquor and showering it over the partitions $p^3$.

The repeated cooling of the carbonic-acid gas, (one source of which carbonic-acid gas may be furnace or combustion gases,) alternated with the introduction of such cooled gas to the ammoniated brine, and also the agitating, lifting, and showering of the brine through such gas during the whole of the carbonating operation are important and valuable features of my process. By repeatedly settling the bicarbonate from the liquor or solution of ammonium chloride and removing the precipitated bicarbonate in successive steps of the process as said bicarbonate is formed the process is greatly facilitated by preventing incrustation of the apparatus or clogging of the same, which would tend to retard the process and greatly detract from its economy. Also by repeatedly removing the bicarbonate the residual ammonium-chloride solution is more quickly brought into a condition for obtaining the solid ammonium chloride therefrom. By dividing the precipitation and separation of the bicarbonate into periods, removing the same substantially as soon as formed, it is not allowed to remain in the apparatus to clog the same, and, furthermore, by this means the cooling effect of the carbonic-acid gas is more economically utilized and the process is greatly facilitated with large economy of time and material and without requiring an extensive plant.

If furnace-gases are to be partially used as a source of carbonic acid, it is often of advantage to proceed as follows: The liquor is treated with furnace-gas until the absorption begins to be difficult, and the second period is carried out with stronger gas, such as limekiln-gas. For this purpose the liquor can successively pass through several absorption vessels, which are with advantage superposed. Purified furnace-gas is passed through the upper vessels and kiln-gas through the lower vessels. The waste gas from the lower vessels can, if desired, be passed with the furnace-gas through the upper vessels. The construction of the vessels or cylinders can be as described.

The use of furnace, cement, kiln, or other gas, which is a by-product and has not purposely to be made for the ammonia-soda process, has the advantage that it is not necessary to absorb all the carbonic acid completely. The apparatus has therefore a larger capacity, and there is, further, the advantage that an excess of carbonic acid is present in the whole apparatus, which causes the production of less volatile carbonate of ammonia and reduces the amount of ammonia carried away by the gas.

If waste furnace-gases have to be used as a source of carbonic acid, the heat of the latter is with advantage used for the distillation of liquor, as described in my application, Serial No. 714,544, filed April 26, 1899.

The production of cement and hydraulic lime offers great advantages, as described. In regard to absorption vessel $B^2$ it is pointed out that it may be eventually used by itself for the production of bicarbonate. For this purpose and also for giving it a large capacity it is of advantage to circulate the gas at great velocity in such a way that the same gas passes repeatedly through the apparatus. It is also of advantage for the purpose of throwing down a large amount of bicarbonate in this vessel $B^2$ to circulate the liquor at great velocity and return the same liquor several times. In this way a most intimate contact of gas and liquor is obtained.

Instead of revolving cylinders vessels which are fitted with shafts and agitators can be used; but the efficiency of these apparatuses is usually smaller and their use is connected with mechanical difficulties.

The bicarbonate is treated by the following novel method: It is first sufficiently heated and agitated to drive off all the ammonia it contains, and the gas is conducted through a suitable washer. Afterward it is further heated until it is converted into carbonate, and such heating is with great advantage effected by highly-heated carbonic-acid gas. For the purpose of carrying out this method the bicarbonate is with advantage passed successively through a number of superposed furnaces, preferably revolving cylinders. In the upper cylinder the ammonia and moisture and also some carbonic acid is driven out, and for this purpose some heated carbonic acid is conducted through the cylinder or the apparatus is heated by external heat. The rest of the carbonic acid is driven out in the lower cylinders preferably by highly-heated carbonic-acid gas. For this purpose two cylinders are with advantage used, through which the material passes from the upper cylinders. A gas-heater is in communication with the lower cylinder in such a way that gas is passed through the cylinder, returned to the heater, and again passes the cylinders. In this way a continuous circulation is kept up in the lower furnace. The carbonic acid produced from the bicarbonate passes through the upper furnace, where it gives off much of its heat.

If a very heavy soda-ash has to be made, I conduct the carbonate from the lower cylinder described through another furnace, preferably a revolving furnace, in which it is heated to very high temperature by conducting highly-heated carbonic acid from a heater through it. The heating of this furnace can also be effected by combustion of fuel.

For the purpose of facilitating the passage of the gas through cylinders B and B' a fan $f$, Fig. 1, is with advantage used.

The revolving apparatus for treating liquid described can be so modified as to serve for heating purposes. It can also be applied for the lixiviation of ores, which method and apparatus are subjects of a separate application.

Having described my invention, what I claim is—

1. The continuous process for obtaining alkali products and chlorine, which consists in cooling a solution of sodium chloride and simultaneously saturating the same with ammonia, repeatedly treating this saturated solution with cooled carbonic-acid gas to produce bicarbonate of soda and a solution of ammonium chloride, settling the bicarbonate of soda from said solution of ammonium chloride and removing the bicarbonate in successive stages of the process, cooling the solution of ammonium chloride to thereby obtain solid ammonium chloride from said solution, heating the solid ammonium chloride together with an oxide to produce ammonia-gas and a chloride, passing said ammonia-gas into and through a fresh charge of sodium-chloride solution to saturate the same, and decomposing the said chloride by heated air to produce chlorine and an oxide, substantially as described.

2. The continuous process for obtaining alkali products and chlorine, which consists in cooling a solution of sodium chloride and simultaneously saturating the same with ammonia, passing cooled carbonic-acid gas repeatedly into and through this saturated solution of sodium chloride to obtain bicarbonate of soda and a solution of ammonium chloride, agitating and showering the saturated solution in the presence of the cooled carbonic-acid gas to effect a fine subdivision of said solution and bring it into intimate contact with said gas for obtaining a rapid and complete precipitation of the bicarbonate of soda, removing the bicarbonate in successive stages of the process, cooling the solution of ammonium chloride to thereby obtain solid ammonium chloride from said solution, heating the said solid ammonium chloride together with an oxide to produce ammonia-gas and a chloride, causing said ammonia-gas to circulate through a fresh charge of sodium-chloride solution to saturate the same, and decomposing the said chloride by heated air to produce chlorine and an oxide, substantially as described.

3. The continuous process for obtaining alkali products and chlorine, which consists in cooling a solution of sodium chloride and simultaneously saturating the same with ammonia, repeatedly treating this saturated solution with cooled carbonic-acid gas by alternately cooling said gas and passing it into and through the ammonia-saturated solution of sodium chloride and in intimate contact therewith to obtain bicarbonate of soda and a solution of ammonium chloride, passing a current of cooled air or inert gas through the solution of ammonium chloride to obtain solid ammonium chloride therefrom, returning the residual liquor to be again saturated with ammonia, and heating the solid ammonium chloride with an oxide to obtain ammonia-gas and a chloride, passing said ammonia-gas into and through said returned residual liquor and a fresh charge of sodium chloride to saturate said solution, and decomposing said chloride by heated air to produce chlorine and an oxide, substantially as described.

4. The continuous process for obtaining alkali products and chlorine, which consists in cooling a solution of sodium chloride and simultaneously saturating the same with ammonia, obtaining bicarbonate of soda and ammonium-chloride solution from the solution of sodium chloride and ammonia by treating the latter solution with cooled carbonic-acid gas repeatedly and with an excess of the acid, said gas being alternately cooled and passed into said solution, passing the waste gas from these carbonating operations into and through a fresh charge of sodium-chloride solution, obtaining solid ammonium chloride from the solution of ammonium chloride by continuously circulating a current of cooled air or inert gas through said solution, returning the residual liquor to the fresh charge of sodium-chloride solution, heating the solid ammonium chloride with magnesium oxide or other suitable oxide to obtain ammonia-gas and a chloride, causing said ammonia-gas to circulate continuously through a fresh charge of sodium-chloride solution for saturating the same, decomposing the said chloride by heated air to obtain chlorine and an oxide, and returning this oxide to be again treated with ammonium chloride and heat, substantially as described.

5. The continuous process for obtaining alkali products and chlorine, which consists in cooling a solution of sodium chloride and simultaneously saturating the same with ammonia, treating this saturated solution with cold carbonic-acid gas by repeatedly cooling said gas and passing it into and through said solution to obtain bicarbonate of soda and a solution of ammonium chloride, meanwhile lifting and showering the solution to bring it into a state of fine subdivision and in intimate contact with said gas, settling the bicarbonate of soda from said solution of ammonium chloride and removing the bicarbonate in separate quantities and during successive stages of the process, cooling the solution of ammonium chloride to thereby obtain solid ammonium chloride from said solution, heating the solid ammonium chloride together with an oxide to produce ammonia-gas and a chloride, continuously passing said ammonia-gas into and through a fresh charge of sodium-chloride solution to saturate the same, and decomposing the said chloride by heated air to produce chlorine and an oxide, substantially as described.

6. The method of obtaining bicarbonate, which consists in causing ammoniated brine and cooled carbonic-acid gas to flow in reverse directions to and in intimate contact with each other, agitating the said brine and cooled carbonic-acid gas together and showering the brine through said gas during the whole of the carbonating operation, repeatedly cooling the said carbonic-acid gas to remove the heat evolved by the chemical reaction and alternately passing said repeatedly-cooled gas through said brine, and repeatedly settling and separating from the liquor a thick sludge containing bicarbonate.

Signed at New York, in the county of New York and State of New York, this 2d day of February, A. D. 1900.

PAUL NAEF.

Witnesses:
GEO. H. COREY,
EDWIN F. COREY.